United States Patent [19]

Worthington

[11] 4,450,626
[45] May 29, 1984

[54] BOLT-CUTTER DEVICE

[76] Inventor: Charles E. Worthington, R.R. 6, Box 280, Logansport, Ind. 46947

[21] Appl. No.: 423,429

[22] Filed: Sep. 24, 1982

[51] Int. Cl.³ .............................................. B26B 13/00
[52] U.S. Cl. ...................................... 30/226; 30/233
[58] Field of Search ................ 30/233, 226, 131, 316, 30/241, 358

[56] References Cited
U.S. PATENT DOCUMENTS

| 54,520 | 5/1866 | Flinn | 30/226 |
| 2,288,385 | 6/1942 | Beard | 30/226 X |
| 2,527,735 | 10/1950 | Johnson | 30/226 |
| 2,543,018 | 2/1951 | Hainline | 30/131 |
| 2,560,318 | 7/1951 | Wenger | 30/226 |
| 3,370,353 | 2/1968 | Weissman | 30/226 X |

Primary Examiner—Jimmy C. Peters
Attorney, Agent, or Firm—Robert A. Spray

[57] ABSTRACT

A bolt cutter device having a generally cylindrical body member in the form of a sleeve, and a shear body slidably movable therein, the body member having tapped openings each receivable of a bolt to be cut.

4 Claims, 5 Drawing Figures

BOLT-CUTTER DEVICE

The present invention relates to a bolt cutter device, and more particularly to a manually-operable device operable to cut or shear bolts of various sizes to any desired length.

The device is provided economically from just two components, i.e., a body member and a relatively movable shear body; and the body member is provided with receiver openings each adapted to receive the shank of a bolt to be cut.

The body member is advantageously in the form of a sleeve, providing not only the bolt-receiving openings but also retainer means for holding the body member and the shear body in a slidable relationship such that movement of the shear body relative to the body member will cause the shear body to shear off a bolt whose shank is in one of the receiver openings.

In a search made after this invention was made, only a single reference patent was uncovered, that being the patent of King, Jr., U.S. Pat. No. 3,803,895. However, it is not of a sleeve form, provides no threaded openings for sturdy holding of a bolt in a specific position to assure correct cut-length, provides no optional use by retainer holes of differing sizes, the walls are not stepped to correspond with a variety of bolt-sizes, and appears to not contemplate the shearing of bolts in contrast to tubular members.

The present invention, in contrast, provides those features; and permits a very convenient and handy bolt-cutting, yielding a very clean cut, providing considerable option and uniformity of length of bolts, accommodates various sizes of bolts, and gives fullness of bolt-support minimizing the chance of any damage to the threads of the bolt being cut.

The above description is of somewhat introductory and generalized form. More particular details, concepts, and features are set forth in the following and more detailed description of an illustrative embodiment, taken in conjunction with the accompanying drawings, which are of somewhat schematic and diagrammatic nature, and in which.

Figure 1:
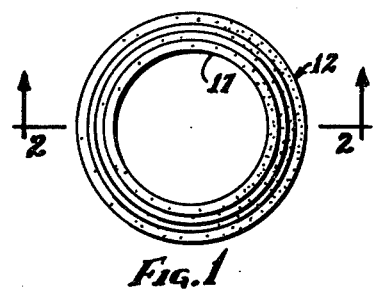
FIG. 1 is a top view of a body member of a bolt-cutter device according to the invention.
Figure 4:
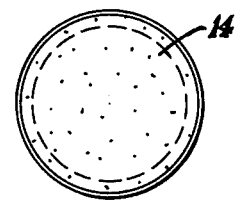
FIG. 4 is a top view of a shear body which is slidably movable in the hollow bore of the body member of FIGS. 1-2.
Figure 3:
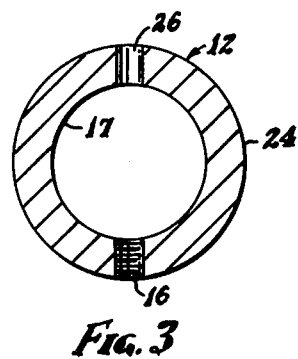
FIG. 3 is a horizontal cross-sectional view, taken generally as shown by Section-line 3—3 of FIG. 2, of the body member of FIGS. 1 and 2.
Figure 2:
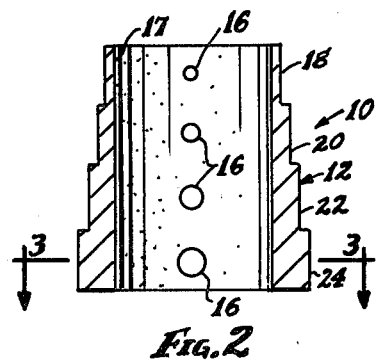
FIG. 2 is a vertical cross-sectional view thereof, as shown as taken generally by Section-line 2—2 of FIG. 1.
Figure 5:
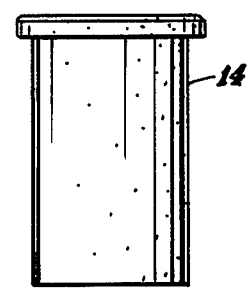
FIG. 5 is an elevation view of the shear body of FIG. 2.

As shown in the drawings, the present invention provides an advantageous bolt cutter device 10; and as shown the device 10 includes a body member 12 and a relatively movable shear body 14.

The body member 12 is shown as being provided with a series of tapped receiver openings 16 each adapted to receive the shank of a bolt (not shown) to be cut by actuation of the device.

Retainer means are provided for holding the body member 12 and the shear body 14 in a slidable relationship, that is, an assembly such that movement of the shear body 14 relative to the body member 12 will cause the shear body 14 to operatively engage the bolt whose shank is positioned in one of the receiver openings 16, and thereby shear the bolt when the shear body 14 is moved, by the force of a punching action upon the shear body 14 to achieve the bolt-shearing action of the device.

As shown, the body member 12 is provided in the form of a generally cylindrical sleeve; and the portions of the walls thereof which are circumferentially spaced from the various receiver openings 16 thereof provide the retainer means which retain the body member 12 and the shear body 14 in the slidable arrangement operative to achieve the desired bolt-shearing operativity. The shear body 14 is also shown cylindrical in shape, its diameter being a free but close fit with respect to the bore 17 of the body member 12.

More particularly as shown, the retainer openings 16 are provided in various sizes, thus being accommodative of various sizes of bolts to be cut.

It will be noted that the various wall-portions 18, 20, 22, and 24 of the body member 12 are of stepped nature, the thickness of those wall-portions being co-ordinated with the size of the retainer opening 16 in each such portion, thereby providing support for the bolt-shearing actuation co-ordinated with the size of the bolt being sheared.

Preferably as shown, the wall-portions opposite the location of the openings 16 are provided with openings 26 to accommodate extra-long bolts whose shanks are to be cut.

The tapped receiver holes 16 are tapped with whatever are the size and type of threads for which the device is to be used. For example, the thread for the smallest-diameter portion 18 is a very small thread, e.g., a "2–56" size thread. The thread sizes increase according to the increases in diameter, the thread for the wall portion 24 being, e.g., a "10–24" thread size.

The differences in the wall thicknesses 18, 20, 22, and 24 are not critical; their variation of size is so that the wall thickness will generally correspond to the thickness of a nut which is usually provided for the respective size and type of bolt. The wall-thickness of the holder 12 varying as it does between wall-portions 18, 20, 22, and 24, thus provides more support for the relatively thicker bolts to be cut by the device. Because of the very small size of the bolts used with wall-portion 18, their bodies are relatively weak and easy to shear; and thus the smaller wall portion 18 does not need to be very thick to provide ample support during the shearing operation; but the concepts are not limited to particulars of wall thicknesses, nor to the size and nature of threaded openings here shown as illustrative of the inventive concepts.

It is thus seen that a bolt-cutter device according to the inventive concepts as herein set forth provides a desired and advantageous device, yielding the advantages of ease and convenience of cutting of a bolt to a desired length, in a cleanly sheared manner and with minimal chance of damaging the threads of the bolt being cut or sheared.

Accordingly, it will thus be seen from the foregoing description of the invention according to this illustrative embodiment, considered with the accompanying drawings, that the present invention provides new and useful combination concepts of a novel and advantageous bolt-shearing device, yielding desired advantages and characteristics, and accomplishing the intended objects, including those hereinbefore pointed out and others which are inherent in the invention.

Modifications and variations may be effected without departing from the scope of the novel concepts of the invention; accordingly, the invention is not limited to the specific embodiment or form or arrangement of parts herein described or shown.

What is claimed is:

1. A bolt cutter device, comprising:

a body member and a relatively movable shear body, the body member being provided with receiver openings adapted to receive the shank of a bolt to be cut, and retainer means holding the body member and the shear body in a slidable relationship such that movement of the shear body relative to the body member will cause the shear body to operatively engage a bolt whose shank is in one of the receiver openings and thereby shear the bolt;

in a combination in which the body member is provided in the form of a generally cylindrical sleeve, the portions thereof which are circumferentially spaced from the said receiver openings thereof providing the retainer means which retain the body member and the shear body in the slidable arrangement operative as aforesaid;

in a combination in which the portions of the body member which are circumferentially spaced from the said receiver openings also provide an auxiliary support for the bolt positioned in one of the respective receiver openings, by the provision of opening means provided in said circumferentially spaced body member portions diametrically opposite the respective receiver openings;

the said opening means and the said receiver openings providing diametrically-spaced support openings carrying the associated bolt, which is desired to be cut, perpendicularly to the axis of the cylindrical sleeve body member, the bolt-shear operability being accomplished with the bolt thusly held and by the relative sliding of the shear body axially of the cylindrical sleeve body member.

2. The invention as set forth in claim 1, in which the retainer openings are provided in various sizes accommodative of various sizes of bolts to be cut.

3. The invention as set forth in claim 2 in a combination in which the wall-portions of the said body member are of stepped nature, the thickness of its portions being co-ordinated with the size of the retainer opening in each such portion, thereby providing support for the bolt-shearing actuation co-ordinated with the size of the bolt being sheared.

4. The invention as set forth in claim 1 in which the said receiver openings are provided with screw threads of a thread size co-ordinated with the size of the respective receiver openings.

* * * * *